| United States Patent [19] | [11] Patent Number: 4,860,244 |
| Bruckert et al. | [45] Date of Patent: Aug. 22, 1989 |

[54] BUFFER SYSTEM FOR INPUT/OUTPUT PORTION OF DIGITAL DATA PROCESSING SYSTEM

[75] Inventors: William F. Bruckert, Hudson; Barry Flahive, Westford; James V. Lacy, Northboro, all of Mass.

[73] Assignee: Digital Equipment Corporation, Maynard, Mass.

[21] Appl. No.: 549,608

[22] Filed: Nov. 7, 1983

[51] Int. Cl.⁴ ............................................. G06F 9/00
[52] U.S. Cl. ...................................... 364/900; 364/939; 364/939.3
[58] Field of Search ............................. 364/200, 900

[56] References Cited

U.S. PATENT DOCUMENTS

| 4,099,231 | 7/1978 | Kotok et al. | 364/200 |
| 4,156,906 | 5/1979 | Ryan | 364/200 |
| 4,204,251 | 5/1980 | Brudevold | 364/200 |
| 4,232,366 | 11/1980 | Levy et al. | 364/200 |
| 4,245,303 | 1/1981 | Durvasula et al. | 364/200 |
| 4,490,784 | 12/1984 | Ives et al. | 364/200 |
| 4,509,115 | 4/1985 | Manton et al. | 364/200 |

Primary Examiner—Gareth D. Shaw
Assistant Examiner—John G. Mills
Attorney, Agent, or Firm—Finnegan, Henderson, Farabow, Garrett & Dunner

[57] ABSTRACT

A data transfer system for use in transferring data between a memory and an input/output system in a digital data processing system. The data transfer system includes a plurality of buffers into which data can be loaded from the memory or the input/output system. A buffer control selects the buffer to be loaded, and control signals from the memory govern the transfer of data from the memory into and out of the selected buffer.

40 Claims, 8 Drawing Sheets

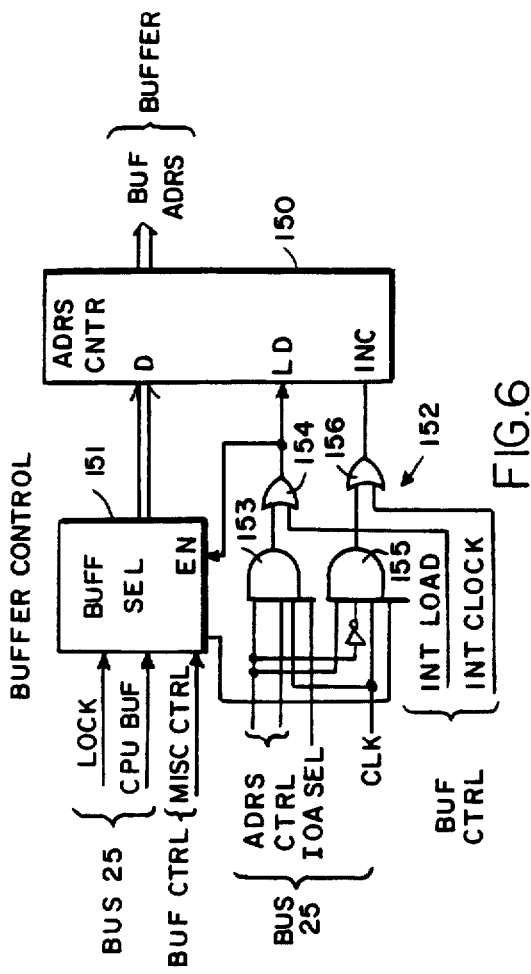
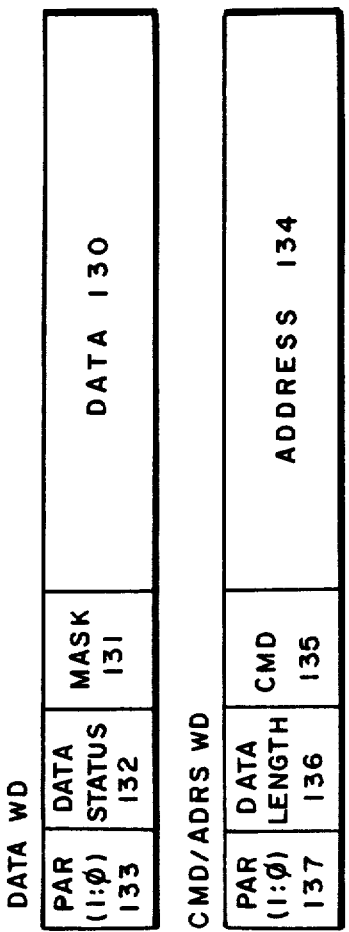
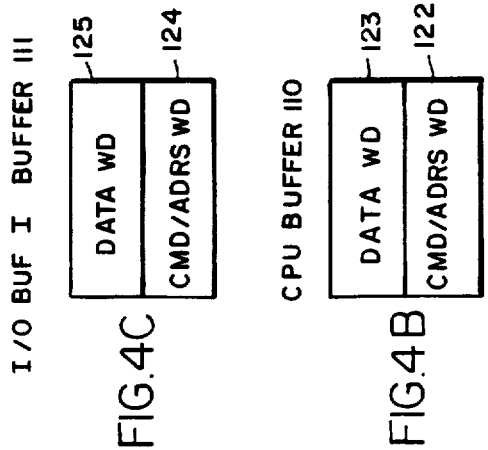

FIG. 5B (A)
↓

IN RESPONSE TO READ REQUEST FROM I/O BUS, BUFFER CONTROL SELECTS AN I/O A, B OR C BUFFER, OR, IF READ INTERLOCK, THE I/O I BUFFER, AND LOADS THE COMMAND AND ADDRESS INTO CMD/ADRS WORD OF THE SELECTED BUFFER —220

↓

BUFFER CONTROL LOGIC TRANSMITS IOA REQ SIGNAL ON ABUS TO REQUEST TRANSFER WITH MEMORY —221

↓

WHEN MEMORY TRANSMITS IOA SEL SIGNAL IDENTIFYING ADAPTER AND ADRS CTRL (1:0) SIGNAL INDICATING "LOAD", BUFFER CONTROL LOGIC LOADS ADDRESS OF COMMAND/ADDRESS WORD OF BUFFER INTO A COUNTER AND ENABLES BUFFER TO TRANSMIT CONTENTS OF COMMAND/ADDRESS WORD ONTO ABUS —222

↓

MEMORY THEN TRANSMITS ADRS CTRL (1:0) SIGNAL INDICATING "INCREMENT" ENABLING BUFFER CONTROL LOGIC TO INCREMENT COUNTER —223

↓

ADAPTER WAITS FOR DMA DONE SIGNAL FROM MEMORY. MEMORY TRANSMITS DMA DONE SIGNAL. THEN IOA SEL SIGNAL IDENTIFYING ADAPTER AND MEM OUT SIGNAL AND READ DATA, AND ADAPTER LOADS DATA INTO WORD IN BUFFER IDENTIFIED BY COUNTER —224

↓

AFTER DMA DONE SIGNAL IS RECEIVED, ADAPTER PREPARES TO TRANSMIT DATA ONTO I/O BUS —225

↓

DONE

FIG. 5C (B)
↓

IN RESPONSE TO CPU WRITE REQUEST, MEMORY TRANSMITS
IOA SEL SIGNAL IDENTIFYING ADAPTER, ADRS CTRL (1:0)
SIGNAL INDICATING "LOAD", MEM OUT SIGNAL AND
CPU BUFF SIGNAL AND A COMMAND/ADDRESS WORD. — 230
BUFFER CONTROL LOGIC OF SELECTED ADAPTER LOADS
ADDRESS OF CPU BUFFER CMD/ADRS WORD INTO COUNTER
AND LOADS COMMAND AND ADDRESS INTO CMD/ADRS WORD

↓

MEMORY MAINTAINS IOA SEL AND MEM OUT SIGNAL, — 231
CHANGES ADRS CTRL (1:0) SIGNAL TO "INCREMENT" AND
TRANSMITS DATA. BUFFER CONTROL LOGIC
INCREMENTS COUNTER AND LOADS DATA INTO
IDENTIFIED WORD OF BUFFER

↓

BUFFER CONTROL LOGIC ENABLES TRANSFER OF — 232
COMMAND, ADDRESS AND DATA OVER I/O BUS AND
WAITS FOR CONFIRMATION SIGNAL

↓

WHEN CONFIRMATION SIGNAL ARRIVES, IS THERE — 233
AN INDICATION OF AN ERROR?

↓ NO

TRANSMIT CPU BUFF DONE SIGNAL — 234

↓

DONE

YES

TRANSMIT CPU BUFF ERR SIGNAL — 235

↓

DONE

┌─ 240
IN RESPONSE TO CPU READ REQUEST, MEMORY TRANSMITS
IOA-SEL SIGNAL IDENTIFYING ADAPTER, ADRS CTRL (1:0)
SIGNAL INDICATING "LOAD", MEM OUT SIGNAL, AND CPU BUF
SIGNAL, AND A COMMAND/ADDRESS WORD. BUFFER CONTROL
LOGIC OF SELECTED ADAPTER LOADS ADDRESS OF CPU BUFFER
CMD/ADRS WORD INTO A COUNTER AND LOADS COMMAND/ADDRESS
INTO CMD/ADRS WORD OF BUFFER

↓

MEMORY WAIT FOR CPU BUF DONE SIGNAL FROM ADAPTER.
ADAPTER RETRIEVES CONTENTS OF ADDRESSED REGISTER — 241
AND LOADS IN DATA WORD OF CPU BUF

↓

WHEN ADAPTER HAS RETRIEVED CONTENTS OF ADDRESSED — 242
REGISTER, IT TRANSMITS CPU BUF DONE SIGNAL

↓

MEMORY TRANSMITS IOA SEL SIGNAL IDENTIFYING ADAPTER, ─ 243
ADRS CTRL (1:0) SIGNAL INDICATING "LOAD" AND CPU BUF
SIGNAL. BUFFER CONTROL LOGIC ENABLES DATA WORD
OF CPU BUF TO BE TRANSMITTED TO MEMORY

↓

DONE

BUFFER SYSTEM FOR INPUT/OUTPUT PORTION OF DIGITAL DATA PROCESSING SYSTEM

BACKGROUND OF THE INVENTION

1. Field of the Invention

The invention relates generally to the field of data transfer systems, and more specifically to transfer arrangements for transferring data in a digital data processing system. The invention provides a buffer system that buffers data transfers between a processor and memory, on the one hand, and an input/output system, on the other hand, which enables the efficient transfer of data therebetween.

2. Description of the Prior Art

A digital data processing system generally includes three basic elements; namely, a memory element, an input/output element, and a processor element, all interconnected by one or more busses. The memory element stores data in addressable storage locations. This data includes both operands and instructions for processing the operands. The processor element causes data to be transferred or fetched, to it from the memory element, interprets the incoming data as either instructions or operands, and processes the operands in accordance with the instruction. The results are then stored in addressed locations in the memory element. An input/output element also communicates with the memory element in order to transfer data into the system and to obtain the processed data from it. The input/output elements normally operate in accordance with control information supplied to it by the processor element. The input/output elements may include, for example, printers, teletypewriters or keyboards and video display terminals, and may also include secondary data storage devices such as disk drives or tape drives.

Buffers are often used to synchronize communications between the various elements in a data processing system. A buffer is a storage element containing one or more storage locations which receives data from one part "upstream" of the system, and transmits it to a "downstream" element. Bidirectional buffers also exist which can receive and transmit data in both directions.

Buffers are used for a number of reasons. In some cases, the units to which they are connected may be operating at different transfer speeds. The buffer may receive and store data at the timing speed of the transmitting device and transmit the stored data at the timing speed of the receiving device. In other cases, one unit may transfer data asynchronously (that is, using timing and control signals that are not synchronized to any periodic clocking signal), and the other unit may transfer data synchronously. The buffer communicates with each unit in its timing mode.

Buffers are also used between two units which operate at different operational speeds, particularly if it is desirable that data be available for a receiving unit without risk of delay by a slower transmitting unit or that there be a location in which the transmitting unit may place data if it can transmit the data faster than the receiving unit can accept and use the data. If a receiving unit requires data to be supplied to it at a specific rate, the transmitting unit can load some or all of the data being transferred into a buffer before beginning the transfer to a faster receiving unit. The receiving unit can then take data from the buffer. If the transmitting unit loads only some, but not all of the data in the buffer, it will have to load enough data to ensure that it can supply the rest of the data in the time required by the receiving unit.

Similarly, a faster transmitting unit can place some or all of the data into a buffer before the beginning of a transfer to a slower receiving unit. If the faster transmitting unit does not place all of the data into the buffer before the transfer, the buffer must be large enough to accommodate the slower data acceptance rate of the receiving unit throughout the transfer.

Buffers are often used in controllers or bus adapters of input/output devices. These input/output devices communicate through a controller or bus adapter with the memory element to transfer data for storage in the memory element or to receive data from the memory element for long-term storage in a disk or tape drive or printing or display on a video display terminal. The input/output devices also communicate with the central processing element to receive control information which enables the input/output device to perform an operation, and to transmit status information indicating the operating status of the device.

Data transfers between the input/output controllers on the one hand and the memory and processor, on the other hand, often occur in blocks of a selected maximum number of words, each of which is transferred during a transfer cycle over an input/output bus. For example, U.S. Pat. No. 4,232,366, issued to John V. Levy, et al, on Nov. 4, 1980, and entitled "Bus For A Data Processing System With Overlapped Sequences", discloses a bus in which transfers may occur in blocks of either one, two or three transfer cycles (ignoring the cycles in which acknowledgements are transmitted). In the first cycle, a command and address are transmitted. The command indicates in part, the number of words in the block. For example, if the command is a READ command, the command and address word is the only word in the block. If the command is a WRITE command, there are two words in the block, namely the command and address word, and a second word containing data to be written into the addressed location. Finally, if the command is an EXTENDED WRITE command, there are three words in the block, namely the command and address word, and two data words, one of which is written into the addressed location, and the other being written into the next higher addressed location. Generally, a controller or bus adapter is adapted to connect to a plurality of input/output devices several of which may be engaging in transfers to or from the memory and processor contemporaneously. While only one transfer can occur over a typical bus at a time, the memory and processor may be able to transfer data or control and status information with the controller at the same time that the input/output devices are transferring data with the controller. Prior buffering systems have provided but one buffer path through which all transfers were funnelled. This can slow down transfers among the various units in the system.

SUMMARY OF THE INVENTION

In accordance with the invention, an input/output controller for a data processing system includes a buffer system that comprises a plurality of buffers. One buffer is designated for transferring blocks of control and status information between the input/output units and the central processing unit. The remaining buffers are used to transmit blocks of data between the input/output units and the memory element of the system. When a controller is to engage in a transfer, it selects one of the data buffers and begins loading data into the selected buffer, either from the input/output units or from the memory element. When the controller has loaded the entire block into the buffer, it may then load other blocks into other buffers. After a block of data has been stored in a buffer, the controller begins the transfer to the other element. This transfer may occur from any of the buffers that contain data: the buffer that engages in the transfer is selected by the controller. The transfers of data with the memory element and the input/output units can take place through the buffers at the same time, with the transfers going through different data buffers. Contemporaneously, with transfers through the data buffers, the controller can perform a control information-status transfer with the processor using the buffer allocated therefor.

Other buffers may also be allocated to special uses, in a manner similar to the allocations of one buffer to the control information-status information transfers with the processor. This may be done, for example, for certain interlock operations to synchronize access to data stored in the memory element that may be shared by several elements of the data processing system.

BRIEF DESCRIPTION OF THE DRAWINGS

FIGS. 4A through 4C depict a buffer system useful in the bus adapter depicted in FIG. 3;

FIG. 4D depicts the contents of the storage locations in the buffers depicted in FIGS. 4A through 4C;

FIGS. 5A through 5D are flow diagrams which describe the operations of bus adapter shown in FIG. 3; and FIG. 6 is a block diagram of the buffer control logic portion of the bus adapter depicted in FIG. 3.

DESCRIPTION OF THE PREFERRED EMBODIMENTS

Figure 1:
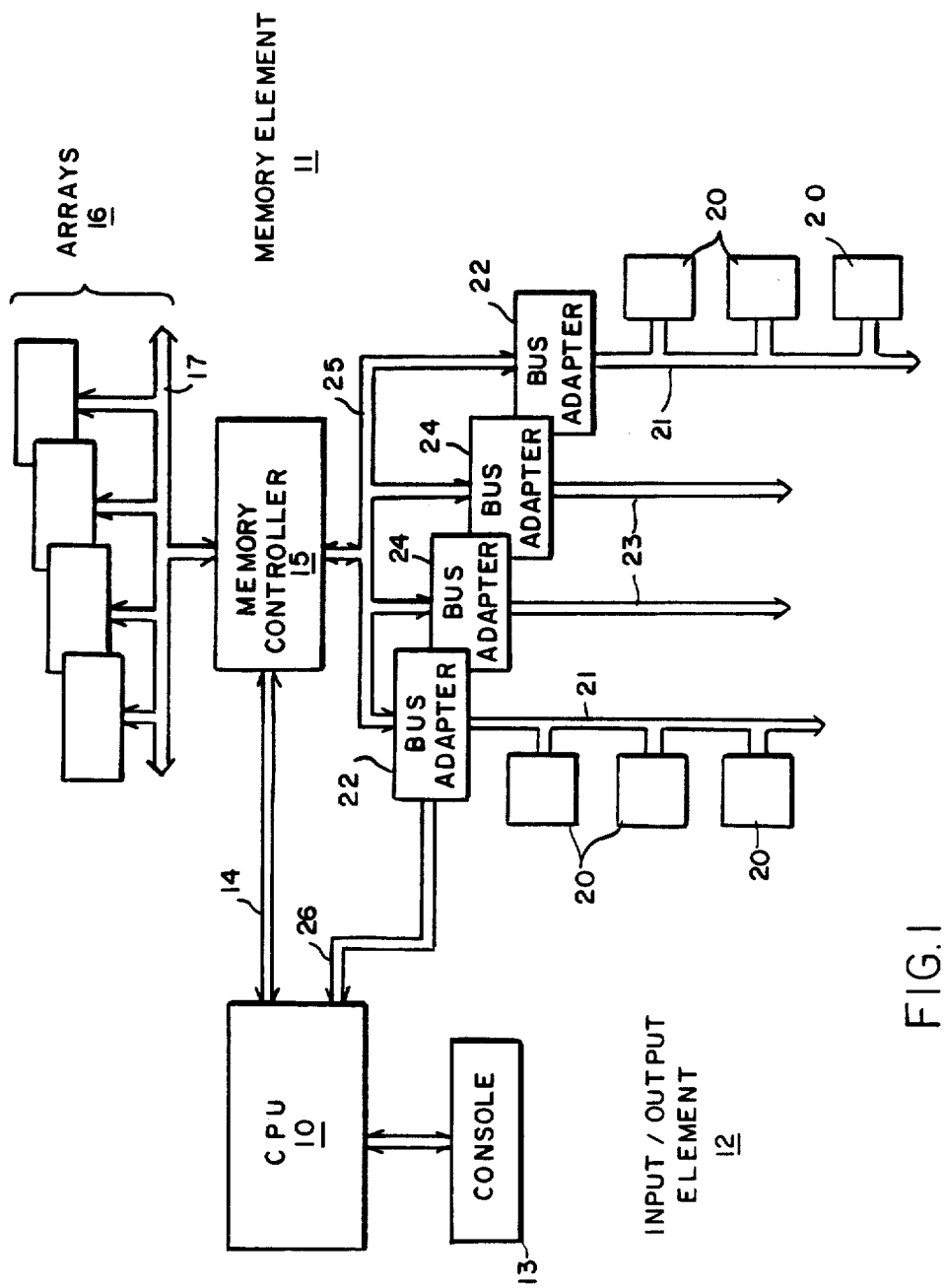
FIG. 1 is a block diagram of a digital data processing system constructed in accordance with the invention.

As exemplified in FIG. 1, the basic elements of a data processing system including the invention comprises a central processor unit (processor) 10, a memory unit 11, and an input/output element 12. The processor 10 executes instructions that are stored in addressable storage locations in the memory unit 11. The instructions identify operations that are to be performed on operands, which are also stored in addressable locations in the memory unit. The instructions and operands are fetched by the processor 10 as they are needed, and processed data are returned to the memory unit. The processor 10 also transmits control information to units in the input/output element, enabling them to perform selected operations, such as transmitting data to or retrieving data from the memory unit 11. Such data may be instructions, operands which may be transmitted to the memory unit or processed data which is retrieved from the memory for storage or display.

An operator's console 13 serves as the operator's interface. It allows the operator to examine and deposit data, halt the operation of the central processor unit 10, or step the central processor unit through a sequence of instructions and determine the responses of the processor in response thereto. It also enables an operator to initialize the system through a boot strap procedure, and perform various diagnostic tests on the entire data processing system.

The central processor unit 10 is connected to the memory unit 11 through several buses generally identified by the reference numeral 14. Specifically, the central processor unit 10 is directly connected to a memory controller 15, which, in turn, connects to a plurality of arrays 16 over an array bus 17. In one specific embodiment, the memory controller also houses a cache memory. Memory controller 15 includes circuitry for retrieving the contents of an addressed location from either the cache or the array 16 and for storing information therein in a conventional manner. Cache memories are well-known in the art and will not be discussed further.

The data processing system may include several types of input/output units, including disk and tape secondary storage elements, teletypewriters, keyboards and video display terminals, and the like. These units 20 are connected through an input/output bus 21 to a bus adapter 22. The input/output bus 21 may be as described in U.S. Pat. No. 4,232,366, which was issued in the name of John V. Levy, et al, and assigned to the assignee of the present invention, the patent entitled "Bus For Data Processing System With Overlap Sequences". Other types of input/output buses may also be used to connect to similar input/output units (not shown), including an input/output bus 23, connected to a bus adapter 24, which may be as described in U.S. Pat. No. 3,815,099, issued June 4, 1974, in the name of J. Cohen et al, and entitled "Data Processing System".

The bus adapters 22 and 24 are connected to transmit and receive data from memory controller 15 over an adapter bus 25. The bus adapters are also connected by an interrupt request/grant bus 26, over which the bus adapters can interrupt the processing of central processor unit 10 in the event of a change of status of one or more of the input/output units 20 in a conventional manner. The central processing unit 10 thus transfers interrupt request and grant signals directly with units in the input/output element, and transmits control information to, and receives status information from, the units in the input/output element 12 through memory controller 15. The memory controller thus controls the transfer of data to and from the central processing unit 10 and the input/output element 12, and the transfer of control and status information between the central processing unit and input/output element 12.

Prior to describing the new buffer, it will be helpful to describe the portion of one embodiment of the data processing system depicted in FIG. 1 in which the buffer is located. In one specific embodiment, the new buffer is used to buffer transfers between memory controller 15 and memory arrays 16.

Figure 2:
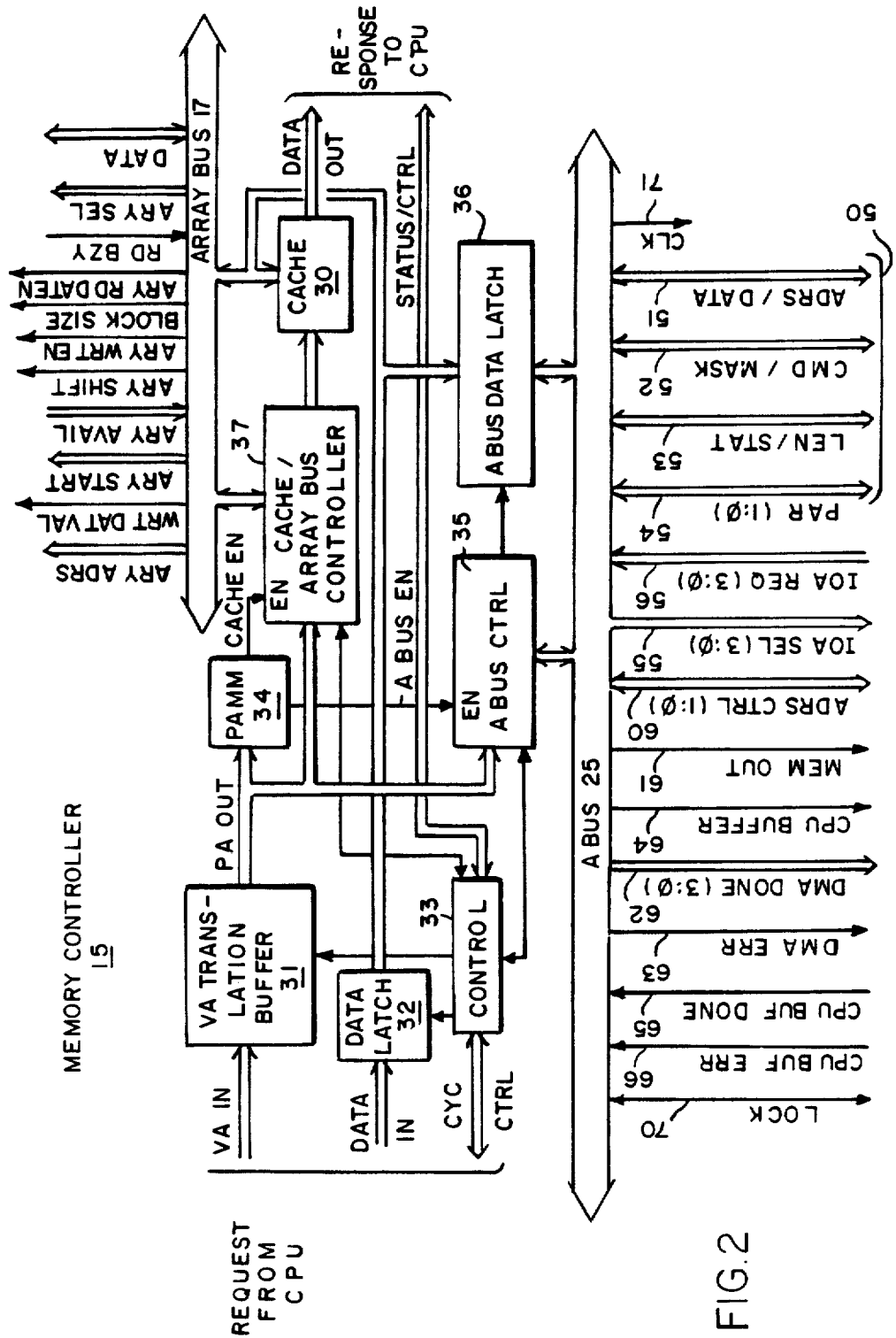
FIG. 2 is a block diagram of a memory controller which may be used in the data processing system depicted in FIG. 1.

With reference to FIG. 2, when memory controller 15 (FIG. 1) receives a memory request from central processor unit (FIG. 1), it receives virtual address signals in a translation buffer 31, data signals in a data latch 32 if the transfer is a WRITE operation, and receives and transmits cycle control signals in a control logic 33, the latter including timing signals, READ/WRITE operation enabling signals, acknowledgement signals and so forth. The translation buffer translates the virtual address in a conventional manner and transmits PA OUT physical address signals to a physical address memory map 34. The physical address may identify either a location in a cache 30 or one of the arrays 16, on the one hand, or in the input/output element 12. If the PA OUT physical address signal identifies a location in input/output element 12, the physical address memory map 34 transmits an ABUS EN adapter bus enable signal, which enables control circuitry 35 and a data latch 36 to engage in a transfer over adapter bus 25. Transfers over one embodiment of adapter bus 25 are described in U.S. Pat. Application Ser. No. 06/549,609, abandoned in favor of U.S. Serial No. 07/165,434, and will not be described further herein. However, if the PA OUT physical address signals identify a location in cache 30 or one of arrays 16 (FIG. 1), the physical address memory map 34 transmits a CACHE EN enabling signal to a cache/array bus controller 37. Controller 37, in turn, determines whether the requested location is in cache 30 or arrays 16. If the requested location is in cache 30, the controller 37 enables the cache to store the data from the data latch 32 if the operation is a WRITE operation, or to transmit the data from the requested location, if the operation is a READ operation, as DATA OUT signals to the central processing unit 10. The control logic 33 also transmits status and control signals to the central processing unit.

Before proceeding further, it would be helpful to describe the various signals transmitted over adapter bus 25 between memory controller 15 and bus adapters 22 and 24. Adapter bus 25 includes a set of information transfer lines generally indicated by the reference numeral 50. Lines 50 includes ADRS/DATA address and data lines 51 which carry address and data signals, lines 52 which carry CMD/MASK command and mask signals, lines 53 which carry LEN/STAT length and status signals, and lines 54 which transmit PAR parity signals. Lines 51 through 54 are bidirectional, carrying signals in both directions between memory controller 15 and the bus adapters.

In one specific embodiment, a plurality of bus adapters may be connected to adapter bus 25. One of lines 55 is connected to each bus adapter. The memory controller energizes one of the lines 55 with an asserted IOA SEL input/output adapter select signal to enable the bus adapter connected thereto to engage in a transfer. The IOA SEL signal may be transmitted in response to an IOA REQ input/output adapter request signal which each bus adapter can transmit onto one of lines 56. Like lines 55, each bus adapter is connected to one of the lines 56. While transmitting an IOA SEL input/output select signal on one of lines 55, the memory controller may transmit ADRS CTRL (1:0) address/control signals on lines 60 which enable the bus adapter to transmit information signals onto, or receive information signals from, lines 50. If a MEM OUT memory out signal on line 61 is asserted, the memory controller transmits information signals over lines 50 to the bus adapter. After a transfer of information over information lines 50 has been completed, the memory controller transmits a DMA DONE signal onto one of lines 62 connected to the bus adapter. Like lines 55 and 56, one of lines 62 is connected to each bus adapter. If the memory controller 15 detects an error during a transfer it transmits a DMA ERR error signal on line 63.

Adapter bus 25 also includes lines which enable transfers between the central processor unit 10 (FIG. 1) and the bus adapters through a special purpose buffer set aside therefor. If a transfer is to occur through this buffer, the memory controller 15 transmits a CPU BUF signal on lines 64, and, when the transfer is complete, the bus adapter transmits a CPU BUF DONE signal on line 65. If the bus adapter detects an error during one of the transfers through this buffer, adapter 22 transmits a CPU BUF ERR signal on line 66.

Adapter bus 25 also includes several other control lines. A line 70 carries a LOCK signal which is used in interlocked transfers. Interlocked transfers for limiting or synchronizing access to shared resources are well-known in the art, and will not be discussed in detail herein. A CLK timing signal on line 71 is used to synchronize transfers over adapter bus 25.

Figure 3:
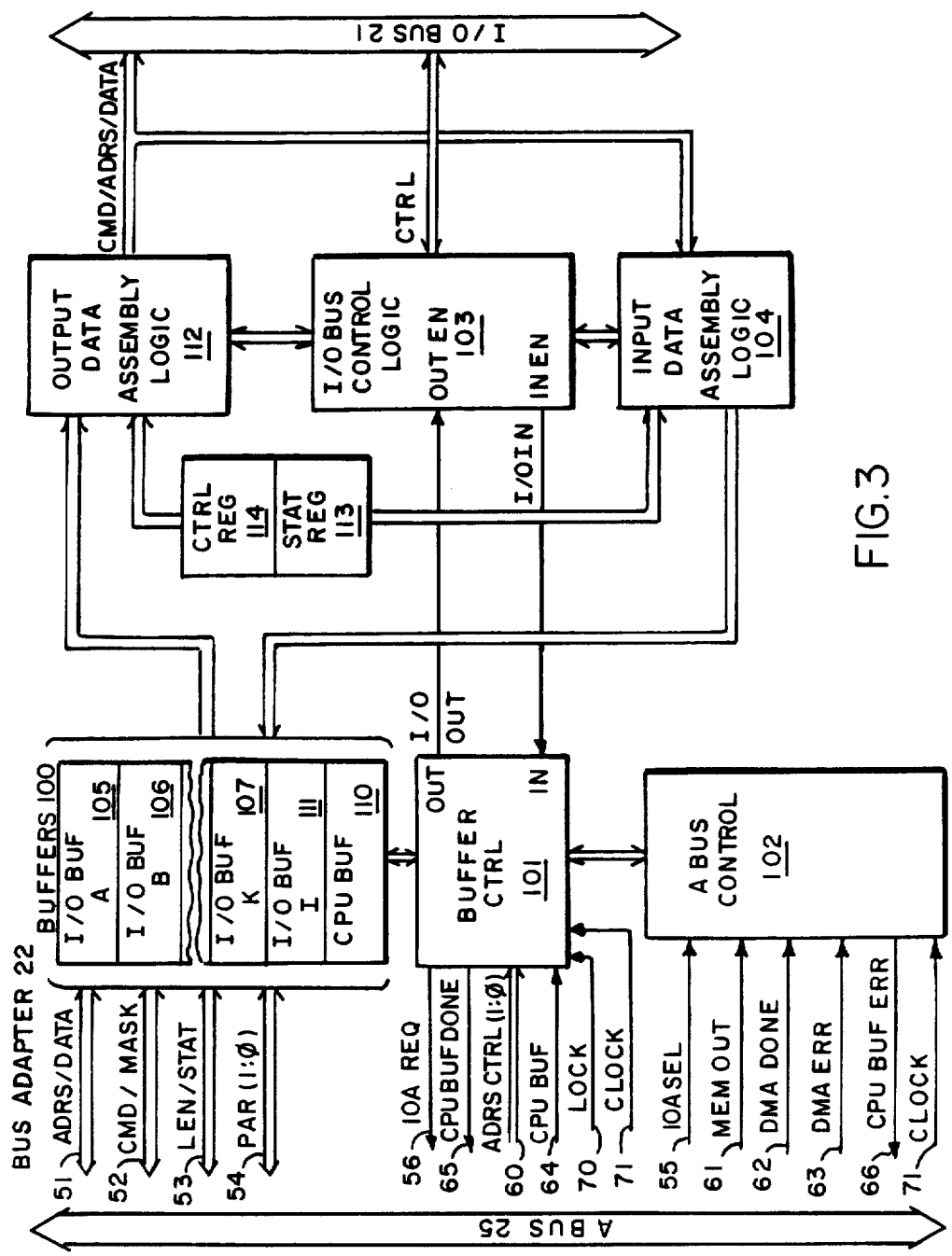
FIG. 3 is a block diagram of an input/output bus adapter constructed in accordance with the invention and useful with the data processing system depicted in FIG. 1.
Figure 5A:
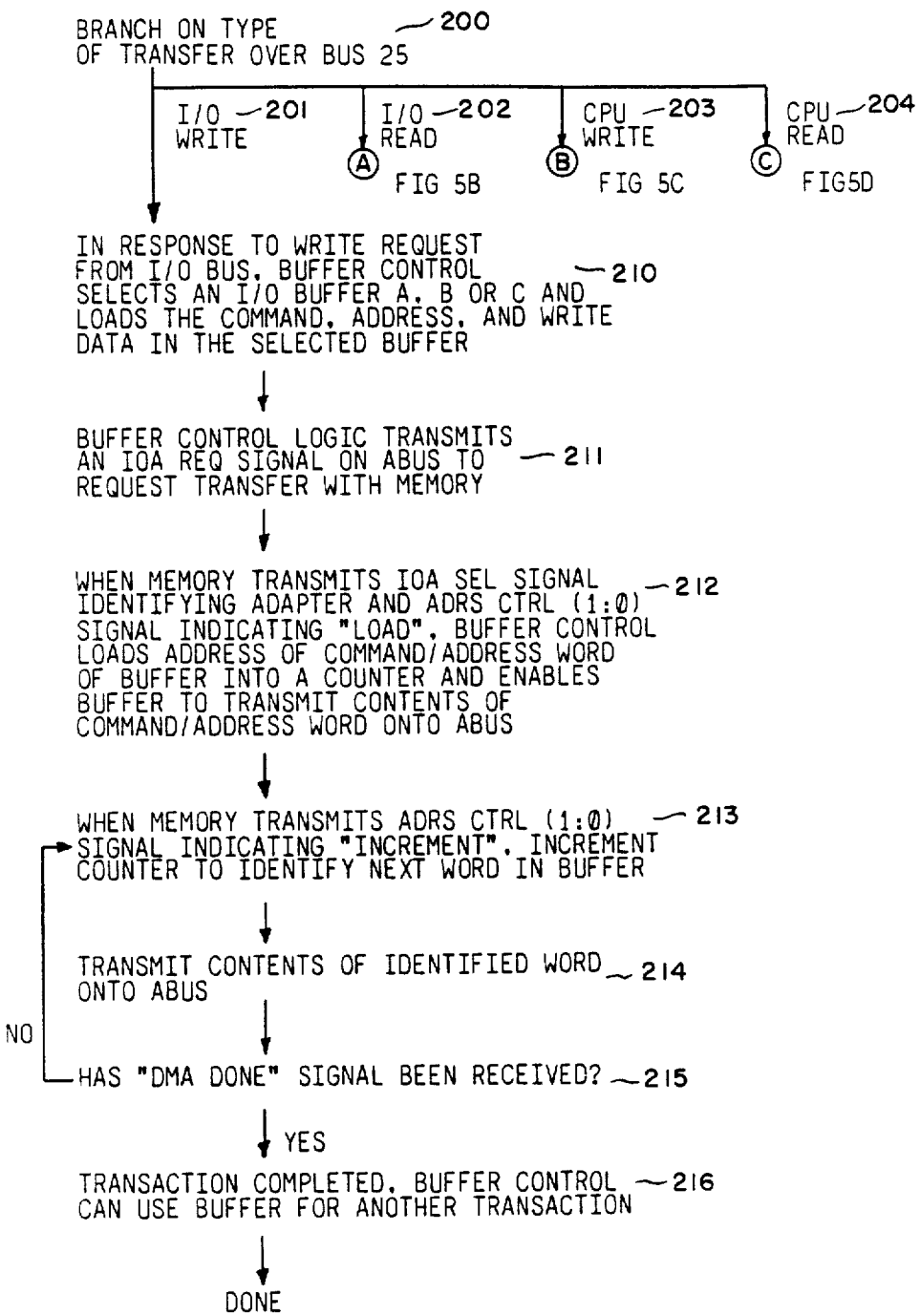

With reference to FIG. 3, bus adapter 22 includes a plurality of buffers 100 which buffer transfers of information between adapter bus 25 and I/O bus 21 (FIG. 1). The buffers 100 are under control of a buffer control logic 101 which selects one of the buffers to engage in a transfer, and enables the selected buffer to store the received information or to transmit the stored information in either direction between adapter bus 25 (FIG. 1) and input/output bus 21 (FIG. 1). An adapter bus control logic 102 operates in conjunction with the buffer control 101 to control transfers over the adapter bus. The buffer control logic 101 and adapter bus control logic 102 together receive and transmit control signals which enable the transfer of information over lines 51 through 54.

In addition, buffer control logic transmits enabling signals to, and receives enabling signals from input/output bus control logic 103 to enable transfers between buffers 100 and input/output bus 21 (FIG. 1). The input/output bus control logic 103 transmits timing and control signals over and receives corresponding signals from input/output bus 21 to enable information transfers thereover.

As has been mentioned, in one specific embodiment the input/output bus 21 (FIG. 1) is a "synchronous backplane interconnect" described in the aforementioned U.S. Pat. No. 4,232,366. Reference should be made to that patent for details of the signals transferred thereover during an information transfer. In brief, however, when an input/output unit such as units 20 desire to engage in an information transfer, after an arbitration cycle in which one unit is selected to engage in the transfer, the selected unit transmits a command and address during a first bus cycle. The command identifies the operation, such as READ, WRITE, or several modifications of these operations when the address identifies the storage location in memory into which data is to be written or from which data is to be read. The data follows the command and address during the next one or two bus cycles if the command identifies a WRITE operation.

If, on the other hand, the command is a READ command, the input/output unit transmits a READ command and address during one bus cycle. Typically, there will be a delay before memory element 11 (FIG. 1) will be able to obtain the contents of the addressed location. Input/output bus 21 (FIG. 1) is free to allow other transfers to occur over the bus between the time the READ command and address have been transmitted, and the bus cycle in which the READ data is finally transmitted over bus 21.

Transfers initiated by processor 10 are also transmitted over input/output bus 21 (FIG. 1). In response to a WRITE request from processor 10 which identifies a location in an input/output unit 20, the memory controller 15 generates a bus command and address. This command and address are transmitted over input/output bus 21 to the input/output units 20 in the same manner as described above. When the command is a write command, the data is transmitted in the next bus cycle input/output bus 21 following the cycle in which the command and address are transmitted.

Finally, if the command from the processor defines a READ operation, for example, of the status of an input/output unit, the READ command and address are transmitted over input/output bus 21 in one bus cycle, and the READ data will be transmitted in a later cycle, and other information may be transferred between those cycles.

In the synchronous backplane interconnect bus depicted in the aforementioned Patent No. 4,232,366, the command and address, on the one hand, and data, on the other hand, are multiplexed onto the same bidirectional lines. Further, data are transferred in words (termed "longwords" in the patent), with one word being transferred during a bus cycle. Some transfers may be only of one or more fractions of a word, or bytes, each identified by a mask signal transmitted during the previous bus cycle.

Returning to FIG. 3, the command and address signals, WRITE data signals or status information signals are received in an input data assembly 104, which adjusts the format of the signals between the format of input/output bus 21 and adapter bus 25. One example of such a format change is that the mask signals are conditioned to accompany the WRITE data and status information signals with which they are associated, rather than with the preceding set of signals. The input data assembly 104 receives the signals under control of the input/output bus control logic 103. Control logic 103 transmits an I/O IN signal to buffer control logic 101, which enables one of buffers 100 to receive the reformatted command and address and WRITE data signals from input data assembly logic 104. Buffers 100 comprise a plurality of general purpose buffers denominated I/O BUF A through K 105 through 107. If the signals from input data assembly logic 104 are status information signals, they are stored in a CPU BUF buffer 110, which is a soecial purpose buffer set aside for transfers with processor 10. Other special purpose buffers may also be set aside for selected purposes, including, for example, an I/O BUF I 111 which is used as explained below. After a buffer 105 through 107, 110 or 111 contains data, the buffer control logic 101 and adapter bus control logic 102 then initiate a transfer over adapter bus 25, which will be described in detail below with respect to FIGS. 5A through 5D.

When memory controller 15 (FIG. 1) initiates a transfer over adapter bus 25 (FIG. 1), the buffer control logic 101 selects one of buffers 100 to engage in the transfer. The selected buffer stores the signals received from lines 51 through 54. After the data are stored in the selected buffer, buffer control logic 101 transmits an I/O OUT signal to input/output bus control logic 103. The buffer control logic 101 enables the selected buffer 105 through 107, 110 or 111 of buffers 100 to transmit the contents to an output data assembly logic 112. Control logic 103 enables the output data assembly logic 112 to receive the contents of the buffer, reformat them to the format of signals on input/output bus 21, and transmit them onto the respective lines of bus 21.

In addition, bus adapter 22 contains a number of status registers 113 and control registers 114. The central processing unit may load the control registers through buffers 100 and output data assembly logic 112 and may read all of the control and status registers through the buffers and input data assembly logic 104.

FIGS. 4A, 4B and 4C depict details of buffers 105 through 107 (FIG. 4A), buffer 110 (FIG. 4B) and buffer 111 (FIG. 4C). Each buffer 105 through 107 includes a plurality of storage locations, each identified by an address. One storage location in each buffer, namely location 120, stores a command and address word (CMD/ADRS WD), and the remaining locations 121 store data words (DATA WD).

The CPU buffer 110 (FIG. 4B) has two storage locations, each also identified by an address. The CPU buffer has a storage location 122 for storing a command and address word, and a second location 123 for storing a data word.

Similarly, special purpose buffer 111 (FIG. 4C) includes at least two storage locations, each identified by an address. A storage location 124 stores a command and address word, and the remaining storage location or locations 125 store data words. In the specific embodiment in which buffer 111 is used for interlock operations, the buffer has one storage location 125 for storing data words.

FIG. 4D illustrates the contents of a data word (DATA WD) which is stored in locations 121, 123 and 125. The formats of the data words stored in all of these locations are identical, and includes a data field 130 which is transmitted to, or received from lines 51. A mask field 131 received from, or transmitted to, lines 52 identifies the bytes in the data word in field 130 which contain data bytes for the transfer. A data status field 132 which is received from, or transmitted to, lines 53 indicates whether there is an error in the data in field 131. A parity field 133 contains two parity bits, one for the data field 130, and the other for the mask and data status fields 131 and 132. The parity field 133 is transmitted to or received from lines 54.

FIG. 4D also illustrates the contents of a command and address word CMD/ADRS WD in locations 120, 122 and 124 of buffers 100. The command and address words in all of the buffers have the same format. A command and address word includes an address field 134, which is received from, or transmitted to, lines 51. A command field 135 received from or transmitted to lines 52 contains a read or write command, or variations on these commands such as an interlock command. The command and address word also includes a data length field 136. In the command and address word in location 122 in CPU buffer 110, the data length field 136 operates much like mask field 131 in connection with data word 123. In that case, the data length field indicates which of the bytes in the data field 130 in data word 123 contain data. In the command and address words 124 and 120 in buffers 105 through 107 or 111, the data length field identifies the number of data words in the buffer, that is, the number of locations in the buffer that have been filled. Thus, the adapter 22 (FIG. 1), or the memory controller 15 (FIG. 1), can determine the number of transfers required to fill or empty a buffer by examining the contents of the data length field 136 of the selected buffer. The command and address word also has a parity field 137 including a parity bit which covers address field 134, and a second parity bit that covers both the command and data length fields 135 and 136.

With this background, a detailed description of transfers over adapter bus 25 (FIG. 1) will now be described. In brief, when memory controller 15 (FIG. 1) initiates a transfer, or when it selects a bus adapter to engage in a transfer in response to a IOA REQ request signal on a line 56 (FIG. 2,3), memory controller 15 transmits an enclosed ADRS CTRL signal on lines 60 (FIG. 2,3) indicating "load" which enable the buffer control logic 101 to select one of the buffers to engage in the transfer. If the CPU BUF signal on line 64 (FIG. 2,3) is asserted, the buffer control logic 101 selects the CPU buffer 110 to engage in a transfer. If other signals indicate that the other special purpose buffers are to, or may, be selected to engage in a transfer, the buffer control logic may select that buffer. In response, and if the MEM OUT signal on line 61 is negated, the buffer control enables the selected buffer to transmit the contents of the storage location containing the command and address word from the selected buffer over lines 51 through 54 to memory controller 15. The memory controller 15 then transmits an encoded ADRS CTRL signal on lines 60 which cause the buffer control logic to indicate "increment". In response, the buffer control logic 101 enables the storage location in buffer 100 having the next higher address, that the DATA WDO data word in the selected buffer (see FIGS. 4A, 4B and 4C). The buffers 100 then transmit the contents of the selected word onto lines 51 through 54. This process continues until the number of words indicated by the "data length" field 136 of the command and address word have been transferred from the buffer. A similar process occurs for transfers from the memory controller 15 to bus adapter 22.

A detailed description of the transfers over bus 25 will now be described in connection with FIGS. 5A through 5D. Four types of transfers can occur over adapter bus 25 (step 200). First, bus adapter 22 (FIG. 1) may engage in an input/output DATA transfer, in which it receives a WRITE command (step 201) or a READ command (step 202) from input/output bus 21 (FIG. 1). Bus adapter 22 may engage in a CPU WRITE transfer (step 203) in which the central processor unit 10 transmits control information either to one of control registers 114 (FIG. 3) or one of input/output units 20 (FIG. 1). The last type of transfer in which bus adapter 22 engages is a CPU READ transfer (step 204) in which the central processor unit is retrieving the contents of a control register or status register 113 (FIG. 3) in bus adapter 22 or a register in one of the input/output units 20.

If the transfer is an input/output WRITE transfer, buffer control logic 101 selects, in response to the I/O IN signal from input/output bus control logic 103, one of the input/output buffers 105 through 107 to engage in the transfer. If the transfer requires the use of a special purpose buffer such as buffer 111, it will select that buffer instead. In either case, buffer control logic 101 enables the WRITE command and address to be loaded into the command address word 120 of the selected buffer, and also enables the data to be written to be loaded into the locations 121 of the selected buffer (step 210). The buffer control logic then transmits an IOA REQ request signal, on its one of lines 56 of the adapter bus 25 to request a transfer to the memory controller 15 (step 211).

When memory controller 15 (FIG. 1) transmits an IOA SEL select signal on the one of lines 55 connected to bus adapter 22, and an encoded ADRS CTRL control signal on lines 60 indicating "load", the buffer control logic 101 (FIG. 3) loads the address of the command and address word of the selected buffer into a buffer address counter and enables the buffer to transmit the contents of the identified command and address storage location onto the adapter bus 25 (step 212). One specific embodiment of a buffer address counter circuit will be described below with respect to FIG. 6.

After bus adapter 22 transmits the command and address word onto adapter bus 25, the memory controller receives the command and address word in data latch 36. The memory controller immediately decodes the command in field 135, and recognizes it as a WRITE command. The data length field 136 indicates the number of data words contained in locations 121 or 125 to be transferred. In response, the memory controller 15 proceeds to enable bus adapter 25 to transmit the data words which are stored in the storage locations 121 or 125 of the selected buffer. To accomplish this, the memory controller 15 transmits encoded ADRS CTRL control signals over lines 60 indicating "increment", to enable buffer control logic 101 to increment the address in the buffer address counter that was initially loaded in step 212 so as to identify the first location in the selected buffer for storing a data word (step 213).

In response to the encoded ADRS CTRL signal indicating "increment", the buffer control logic 101 increments the buffer address counter, which then identifies the first data word in locations 121 or 125. The contents of this location, a data word (FIG. 4D), are then transmitted onto lines 51 through 54 to the memory controller 15 (step 214). Steps 213 and 214 repeat until the memory controller 15 has received the number of data words indicated in the data length field 136 in the command and address word transmitted in step 212. The memory controller then transmits a DMA DONE signal on line 62 in step 215. At this point the transfer is complete (step 216) and the buffer control logic can use the buffer for another transfer.

The input/output read transfer (step 202) is described in connection with the flow diagram depicted in FIG. 5B. If the command received from input/output bus 21 is a READ command, the buffer control logic 101 selects one of the input/output buffers 105 through 107, or buffer 111 if the special purpose buffer is required, and loads the READ command and address into the command and address word location 120 or 124 of the selected buffer (step 220). The buffer control logic 101 then transmits an IOA REQ request signal on its connected one of lines 56 to request a transfer to the memory controller 15 (step 221).

When the memory controller 15 is prepared to engage in a transfer with bus adapter 22, it transmits an IOA SEL adapter selection signal on the one of lines 55 connected to the requesting bus adapter, and an encoded ADRS CTRL signal on lines 60 indicating "load". The buffer control logic 101 loads the address of the command address word of the selected buffer into the buffer address counter. The output of the buffer address counter selects the location in buffers 100 which stores the READ command and address word for the transfer. The buffer control logic then enables the contents of the addressed location to be transmitted onto lines 50 through 54 of adapter bus 25 (step 222).

The memory controller receives the command and address word in data latch 36, and decodes the command as a READ command. The encoded ADRS CTRL signals on lines 60 then transmit an "increment" signal which enables the buffer control logic 101 (FIG. 3) to increment the contents of the buffer address counter. The IOA SEL selection signal on the one of lines 55 which connect to this bus adapter is then negated. However, the buffer address counter has identified the location in the selected buffer which stores the first data word, and, since the DMA DONE signal has not been transmitted, bus adapter 22 cannot use the selected buffer for another transfer.

The memory controller 15 (FIG. 1) then retrieves the desired data. When the memory controller has retrieved the data and is ready to transmit it to bus adapter 22, it transmits the DMA DONE signal on line 62, the IOA SEL signal on the one of lines 55 (FIG. 2, 3) connected to the bus adapter 22 and the MEM OUT signal on line 61 to indicate a transfer to bus adapter 22. The buffer control logic 101 (FIG. 3) prepares to store the data in the location in buffers 100 identified by the buffer address counter. The bus adapter receives the data on lines 51 through 54 and stores it in the location identified by the buffer address counter. The memory controller then transmits an ADRS CTRL control signal indicating "increment" on lines 60. The buffer control logic 101 increments the buffer address counter to identify the next location and enables signals from lines 51 through 54 to be stored in that location. This process then continues until all of the data words have been stored in the selected buffer.

When controller 15 negates the IOA SEL selection signal to bus adapter 22, the transfer to the adapter is completed. The buffer control logic 101 initiates a transfer of the contents of the buffer over input/output bus 21 by transmitting an I/O OUT signal to input/output bus control logic 103 (step 225).

The process by which the memory controller 15 and bus adapter 22 perform a transfer through the CPU buffer 110 (FIG. 3) is somewhat different from the input/output transfers described above in connection with FIGS. 5A and 5B. When the CPU buffer 110 is being used, the memory controller 15 initiates all of the transfers over the adapter bus 25 (FIG. 1).

In response to a WRITE request and accompanying data from the processor 10, the memory controller 15 and bus adapter 22 perform the steps depicted in FIG. 5C. The memory controller transmits an IOA SEL signal on the one of lines 55 connected to the desired bus adapter, an encoded ADRS CTRL signal on lines 60 indicating "load", the MEM OUT memory out signal on line 61, and the CPU BUF signal on line 64. Simultaneously, the memory controller 15 transmits a command and address word (FIG. 4D) on lines 51 through 54 (step 230). The buffer control logic 101 receives the CPU BUF signal on line 64 and enables the counter to load the address of the storage location 122 in the CPU buffer 110 which stores the command and address word. The buffer control logic then enables the identified location in CPU buffer 110 to store the signals on lines 51 through 54. The memory maintains both the IOA SEL signal on the one of lines 56 connected to the bus adapter and the MEM OUT signal in an asserted condition. The encoding of the ADRS CTRL signal on lines 60 is changed to an "increment" condition and the memory controller 15 then transmits the data word (step 231). The buffer control logic increments the buffer address counter and loads the data word into the addressed location 123 of the CPU buffer 110. If the address in the command and address word in the CPU buffer identifies a control register 114 in the bus adapter, the buffer control logic 101 enables the data word to be stored in the identified register. However, if the addressed location is not a register in bus adapter 22, it enables input/output bus control logic 103 to engage in a transfer over the input/output bus 21 (step 232). During that transfer, the input/output bus control logic 103 will, if the transfer is completed successfully, receive a confirmation signal indicating that the data word has been stored in the addressed location. When the confirmation signal arrives, or if bus adapter 22 loads the data word in a control register 114 in bus adapter 22 (step 233) the bus adapter 22 transmits a CPU BUFF DONE signal on line 62 (step 234). If an error occurs on loading data in a register 114, or if no confirmation signal arrives from input/output bus 21, the adapter bus control logic 102 transmits a CPU BUF ERR error signal on line 66 (step 235). This completes the transfer in response to a write operation through CPU buffer 110.

Finally, as described in FIG. 5D, in response to a CPU READ request from processor 10 which identifies a storage location in input/output element 12, the memory controller 15 transmits the IOA SEL signal on the one of lines 55 connected to the bus adapter 22 over which the transfer will occur, an encoded ADRS CTRL signal over lines 60 indicating "load", the MEM OUT signal on line 61, and the CPU BUF signal on line 64. Simultaneously, the memory controller 15 transmits the command and address word (FIG. 4D) on lines 51 through 54 (step 240). The buffer control logic of the bus adapter identified by the asserted IOA SEL signal loads the address of the storage location 122 in CPU buffer 110 which stores the command and address word into a counter and enables the identified location in buffers 100 to receive and store the signals from lines 51 through 54 (step 240).

The bus adapter 22 then proceeds to retrieve the contents of the addressed location. If the address identifies one of registers 113 or 114 in bus adapter 22, buffer control logic 101 retrieves the contents of the register and loads it into the location 123 which stores the data word in CPU buffer 110. If the address identifies a location in an input/output unit 20, the input/output bus control logic 103 performs a transfer over the input/output bus to retrieve the contents of the addressed location. In this case, as well, the contents are stored in the storage location 123 which stores the data word in CPU buffer 110 (step 241).

When the adapter 22 has retrieved the contents of the addressed register, it transmits the CPU BUF DONE buffer done signal on line 65 (FIG. 3) (step 242). In response, the memory controller 15 transmits the IOA SEL signal on the one of lines 55 connected to the bus adapter 22, an encoded ADRS CTRL signal indicating "load" and the CPU BUF signal on line 64 (step 243). The buffer control logic 101 loads the address of storage location 123 into the buffer address counter, and enables the contents thereof to be transmitted over lines 51 through 54 to memory controller 15.

Thus, it can be seen that the memory controller uses the encoded ADRS CTRL buffer address control signals on lines 60 to control loading and incrementing of the buffer address counter to enable transfers over adapter bus 25. Unless a special purpose buffer is required, the buffer control logic selects the buffer being used in the transfer. Further, while a transfer is taking place using one of buffers 105 through 107 over adapter bus 25, the bus adapter 22 can engage in another transfer over input/output bus 21 using another of buffers 105 through 107.

Indeed, on a READ transfer over adapter bus 25, the buffer from which the READ command and address word were transmitted to memory controller 25 is not used until the READ data is returned; the READ data being loaded into the same buffer since its buffer address counter has already been incremented. Other READ or WRITE transfers can be initiated by bus adapter 22 through other buffers, if they each have a separate buffer address counter, between the time the READ command and address word is transmitted and the READ data is returned. Thus, transfers between memory controller 15 and input/output units 20 can be accelerated using the buffer system in bus adapter 22.

FIG. 6 contains a circuit diagram of one example of a buffer address counter including a counter 150, buffer selection logic 151, and a loading and clocking circuit 152. On transfers between bus adapter 22 and memory controller 15, through buffers 100, the buffer control logic 101 selects one of buffers 105 through 107 to engage in the transfer, unless the transfer is to occur through a special purpose buffer such as CPU buffer 110 or buffer 111. The buffer selection logic 151 contains circuitry which identifies the addresses of the locations 120 which store the command and address word of the buffers 105 through 107. The buffer selection logic 151 also has the addresses of the locations 122 and 124 which store the command and address words in special purpose buffers 110 and 111. The buffer selection logic thus receives the signals, such as CPU BUF and LOCK which indicate when the special purpose buffers should be used. When the encoded ADRS CTRL signals indicate "load", the IOA SEL signal for the bus adapter is asserted, and the CLK timing signal is received, an AND gate 153 enables, through an OR gate 154, the LOAD (LD) input of address counter 150, and also enables the buffer selection logic 151 to select a buffer to engage in a transfer, and to transmit the address of the storage location 120, 122 or 124 of the command and address word.

When the encoded ADRS CTRL signal changes to an "increment" condition, an AND gate 155 is energized if the IOA SEL select still identifies the bus adapter 22, when the CLK timing signal on line 71 is asserted. The energized AND gate 155 enables, through an OR gate 156, the "increment" (INC) input of the counter 150. This enables address counter 150 to increment step through the locations in the selected buffer each time the CLK timing signal is received.

The address counter may also be loaded and incremented in response to INT LOAD and INT CLK internal loading and clocking signals to permit transfers with input/output bus 21.

As has been mentioned, each buffer 105 through 107, 110 and 111 may be provided with a separate buffer address counter, as depicted in FIG. 6, to enable the buffers to be separately loaded and unloaded. Further, the buffers may also be provided with separate buffer address counters to enable the transfers to and from the adapter bus 25 to be carried on separately from the transfers to and from the input/output bus 21. For example, if, during an input/output WRITE transfer depicted in FIG. 5A, the memory control 15 transmits the DMA DONE signal immediately after receiving the WRITE command and address word from the selected buffer, it may be desirable to enable buffer control logic to begin loading buffer again for transfers from input/output bus 21, even before the memory controller 15 has received all of the WRITE data from the buffer. To enable this to occur, however, separate buffer address counters must be provided for the adapter bus transfers and the input/output bus transfers.

Further, a data transfer with memory controller 15 over adapter bus 25 can take place with one buffer, for example, I/O BUF A buffer 105 at the same time that a transfer is occurring with input/output bus 21 with respect to another buffer, for example, I/O BUF B buffer 106. Enabling transfers to occur in this manner can significantly increase the amount of data transferred between the input/output bus 21 and the memory controller 15.

The specific embodiment of bus adapter 22 depicted in FIG. 3, has been described in connection with an input/output bus 21 disclosed in the aforementioned U.S. Patent No. 4,232,366. It is apparent to those skilled in the art that other input/output buses could also be used having different signalling sequences, with appropriate modifications of input/output bus control logic 103, input data assembly logic 104 and output data assembly logic 112.

The foregoing description has been limited to a specific embodiment of this invention. It will be apparent, however, that the invention can be practiced in data processing systems having diverse basic construction or in systems that use different internal circuitry than is disclosed in this specification with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data handling system comprising a data transfer control unit and an input/output unit connected by conductors for transferring information in the form of information signals and transfer control signals,
   A. said data transfer control unit including:
      (i) means for transmitting information signals onto and receiving information signals from information signal transfer conductors,
      (ii) means for receiving a transfer request signal from said input/output unit and for transmitting transfer control signals to said input/output unit in response thereto,
   B. said input/output unit comprising:
      (i) a buffer system including a plurality of buffers each comprising a plurality of addressable storage locations, one of said locations in each buffer comprising a starting location identified by a starting address, said buffers accumulating information signals for transfer with said data transfer control unit, and a special purpose buffer comprising a plurality of storage locations each identified by an address, said special purpose buffer being defined by a starting address comprising the address of its storage locations,
      (ii) buffer address control means for generating address signals which identify a storage location in said buffer system,
      (iii) buffer identification means for storing the starting addresses of said buffers in said buffer system, (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and (v) means for transmitting the contents of the location identified by said buffer address control means to said data transfer control unit, wherein said input/output unit enables said special purpose buffer to be used for an information transfer in response to a special purpose buffer control signal, said buffer address control means loading the starting address of said special purpose buffer into said buffer address control means in response to the special purpose buffer control signal.

2. A data handling system as defined in claim 1 wherein said input/output unit further includes means for transmitting a termination signal to said data transfer control unit in response to the conclusion of the information transfer using said special purpose buffer.

3. A data handling system as defined in claim 2 wherein said input/output unit includes a register for storing control and status information connected to said special purpose buffer, said data transfer control unit storing control information in and retrieving information from said register by transferring said information with said special purpose buffer.

4. A data handling system comprising a data transfer control unit and an input/output unit connected by conductors for transferring information in the form of information signals and transfer control signals, A. said data transfer control unit including:
 (i) means for transmitting information signals onto and receiving information signals from information signal transfer conductors,
 (ii) means for receiving a transfer request signal from said input/output unit and for transmitting transfer control signals to said input/output unit in response thereto, B. said input/output unit comprising:
 (i) a buffer system including a plurality of buffers each comprising a plurality of addressable storage locations, one of said locations in each buffer comprising a starting location identified by a starting address, said buffer accumulating information signals for transfer with said data transfer control unit,
 (ii) buffer address control means for generating address signals which identify a storage location in said buffer system,
 (iii) buffer identification means for storing the starting addresses of said buffers in said buffer system,
 (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and
 (v) means for transmitting the contents of the location identified by said buffer address control means to said data transfer control unit, wherein said transfer control signal is encoded to have a load condition and an increment condition, said enabling means including means for enabling said buffer address control signal means to load an address in response to the transfer control signal having the load condition and to increment the address in response to the transfer control signal having the increment condition, and wherein information signals are transferred in words including data words and command words, a command word including fields which specify an operation and a number of data words to be transferred, said data transfer control unit further including means for decoding the command word to determine the operation to be performed and the number of words to be transferred.

5. A data handling system as defined in claim 4 wherein said command word is stored in a buffer in the location having the starting address of the buffer and data words accompanying the command words are stored in the buffer in succeeding locations, the data transfer control unit includes means transmitting the transfer control signal with the load condition to enable the transfer of the command word of the buffer and with the increment condition to transfer the data words from the buffer, the data transfer control unit terminating transfer of said transfer control signal when the number of words specified in the command word have been transferred.

6. A data handling system as defined in claim 5 in which one of the commands specified by a command word indicates that data words are to be transferred to said input/output unit, the command word further including a field that identifies the data words to be transferred said data transfer control unit including means responsive to said command word decoding means for obtaining the number of data words specified in the data word number field for later transfer to said input/output unit.

7. A data handling system as defined in claim 6 wherein said input/output unit includes a plurality of buffer address control means each associated with one of said buffers, said enabling means enabling a selected buffer address control means to load and increment the address of the associated buffer in response to the transfer control signal from said data transfer control unit.

8. A data handling system as defined in claim 7 in which said each said buffer includes a separate buffer address control means for transferring information signals into and out of the associated buffer with said data transfer control unit and with another unit connected to said input/output unit, said enabling means separately enabling each said buffer address control means to enable information signals to be separately stored in and transmitted from said buffer from and to said data transfer control unit and said other unit.

9. A data handling system as defined in claim 8 wherein said data transfer control unit further includes means for transmitting a done signal responsive to the conclusion of an information transfer with said input- /output unit, said enabling means further including means responsive to the receipt of said done signal to enable said buffer address control means to allow the buffer to be used in a subsequent information transfer.

10. A data handling system as defined in claim 9 wherein said data transfer control unit transmits the done signal immediately after receiving the command word from the buffer, the enabling means enabling said buffer address control means which enables information from said other unit to be stored in said buffer for another transfer immediately thereafter.

11. An input/output unit for connection to a data transfer control unit to form a data transfer system, the data transfer control unit including means for transmitting information signals onto and receiving information signals from information signal transfer conductors and means for receiving a transfer request signal from said input/output unit and for transmitting transfer control signals to said input/output unit in response thereto, said input/output unit comprising:
   (i) a buffer system including a plurality of buffers each comprising a plurality of addressable storage locations, one of said location in each buffer comprising a starting location identified by a starting address, said buffers accumulating information signals for transfer with said data transfer control unit,
   (ii) buffer address control means for generating address signals which identify a storage location in said buffer system,
   (iii) buffer identification means for storing the starting addresses of said buffers in said buffer system,
   (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and
   (v) means for transmitting the contents of the location identified by said buffer address control means to said data transfer control unit,
      wherein one of said transfer control signals includes a request signal transmitted by said input/output unit when said input/output unit has information to transfer to said data transfer control unit, and
      wherein said data transfer control unit transmits a select signal to enable said input/output unit to engage in an information transfer, said input/output unit receiving the select signal to enable an information transfer to occur.

12. An input/output unit as defined in claim 11 wherein the data transfer control unit transmits an error signal when it detects error and said input/output unit further includes:
   A. means for detecting an error during a transfer,
   B. means connected to said detecting means for transmitting an error signal in response to the detection of a error by the respective error detection means, and
   C. means for receiving the error signal from said data transfer control unit.

13. An input/output unit for connection to a data transfer control unit to form a data transfer system, the data transfer control unit including means for transmitting information signals onto and receiving information signals from information signal transfer conductors and means for receiving a transfer request signal from said input/output unit and for transmitting transfer control signals to said input/output unit in response thereto, said input/output unit comprising:
   (i) a buffer system including a plurality of buffers each comprising a plurality of addressable storage locations, one of said locations in each buffer comprising a starting location identified by a starting address, said buffers accumulating information signals for transfer with said data transfer control unit,
   (ii) buffer address control means for generating address signals which identify a storage location in said buffer system,
   (iii) buffer identification means for storing the starting addresses of said buffers in said buffer systems.
   (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and
   (v) means for transmitting the contents of the location identified by said buffer address control means to said data transfer control unit,
      wherein said buffer system further includes a special purpose buffer comprising a plurality of storage locations each identified by an address, said special purpose buffer being defined by a starting address comprising the address of one of its storage locations.

14. An input/output unit for connection to a data transfer control unit to form a data transfer system, the data transfer control unit including means for transmitting information signals onto and receiving information signals from information signal transfer conductors and means for receiving a transfer request signal from said input/output unit and for transmitting transfer control signals to said input/output unit in response thereto, said input/output unit comprising:
   (i) a buffer system including a plurality of buffers each comprising a plurality of addressable storage locations, one of said locations in each buffer comprising a starting location identified by a starting address, said buffers accumulating information signals for transfer with said data transfer control unit,
   (ii) buffer address control means for generating address signals which identify a storage location in said buffer system,
   (iii) buffer identification means for storing the starting addresses of said buffers in said buffer system,
   (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and (v) means for transmitting the contents of the location identified by said buffer address control means to said data transfer control unit, and wherein said input/output unit enables said special purpose buffer to be used for an information transfer in response to a special purpose buffer control signal, said buffer address control means loading the starting address of said special purpose buffer into said buffer address control means in response to the special purpose buffer control signal.

15. An input/output unit as defined in claim 14 further including means for transmitting a termination signal to said data transfer control unit in response to the conclusion of the information transfer using said special purpose buffer.

16. An input/output unit as defined in claim 15 further including a register for storing control and status information connected to said special purpose buffer, information being stored in or retrieved from said register by use of said special purpose buffer.

17. An input/output unit for connection to a data transfer control unit to form a data transfer system, the data transfer control unit including means for transmitting information signals onto and receiving information signals from information signal transfer conductors and means for receiving a transfer request signal from said input/output unit and for transmitting transfer control signals to said input/output unit in response thereto, said input/output unit comprising:

(i) a buffer system including a plurality of buffers each comprising a plurality of addressable storage locations, one of said locations in each buffer comprising a starting location identified by a starting address, said buffers accumulating information signals for transfer with said data transfer control unit, (ii) buffer address control means for generating address signals which identify a storage location in said buffer system, (iii) buffer identification means for storing the starting addresses of said buffers in said buffer system, (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and (v) means for transmitting the contents of the location identified by said buffer address control means to said data transfer control unit, and (vi) means for transmitting a direction control signal indicating the direction of transfer of information signals from or to said input/output unit, said input/output unit further including means for receiving said direction control signal and enabling said buffer system to receive information signals from or transmit information signals onto said information signal transfer conductors in response to the condition of said direction control signal.

18. An input/output unit for connection to a data transfer control unit to form a data transfer system, the data transfer control unit including means for transmitting information signals onto and receiving information signals from information signal transfer conductors and means for receiving a transfer request signal from said input/output unit and for transmitting transfer control signals to said input/output unit in response thereto, said input/output unit comprising:

(i) a buffer system including a plurality of buffers each comprising a plurality of addressable storage locations, one of said locations in each buffer comprising a starting location identified by a starting address, said buffers accumulating information signals for transfer with said data transfer control unit, (ii) buffer address control means for generating address signals which identify a storage location in said buffer system, (iii) buffer identification means for storing the starting addresses of said buffers in said buffer system.

(iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and (v) means for transmitting the contents of the location identified by said buffer address control means to said data transfer control unit, and wherein said transfer control signal is encoded to have a load condition and an increment condition, said enabling means including means for enabling said buffer address control means to to load an address in response to the transfer control signal having the load condition and to increment the address in response to the transfer control signal having the increment condition.

19. An input/output unit as defined in claim 18 wherein information signals are transferred in words including data words and command words, a command word including fields which specify an operation and a number of data words to be transferred, each said buffer storing a command word in the storage location having the starting address and means for storing the data words in the succeeding addressable locations.

20. An input/output unit as defined in claim 19 further including a plurality of buffer address control means each associated with one of said buffers, said enabling means enabling a selected buffer address control means to load and increment the address of the associated buffer in response to the transfer control signal from the data transfer control unit.

21. An input/output unit as defined in claim 20 in which said each said buffer includes a separate buffer address control means for transferring information signals into and out of the associated buffer with the data transfer control unit and with another unit connected to said input/output unit, said enabling means separately enabling each said buffer address control means to enable information signals to be separately stored in and transmitted from said buffer from and to said data transfer control unit.

22. An input/output unit as defined in claim 21 wherein the data transfer control unit further includes means for transmitting a signal responsive to the conclusion of an information transfer with said input/output unit, said input/output unit further including means responsive to the receipt of said signal to enable said enabling means to enable said buffer address control means to allow the buffer to be used in another information transfer.

23. An input/output unit as defined in claim 22 wherein the data transfer control unit transmits the conclusion signal immediately after receiving the command word from the buffer, the enabling means enabling said buffer address control means which enables information from said other unit to be stored in said buffer for another transfer immediately thereafter.

24. A data transfer control unit for connection to an input/output unit over a bus to form a data transfer system for engaging in block transfers of a plurality of data words during a plurality of successive bus cycles, the bus including data transfer conductors for transferring data words and control signal conductors for transferring control signals, said data transfer control unit comprising:
   A. data transfer means for transmitting data words onto, and receiving data words from, the input/output unit over the data transfer conductors, and
   B. transfer control means connected to said data transfer means for enabling said data transfer means to transfer data signals, said transfer control means further including means for transmitting an encoded transfer control signal having a first condition to enable the transfer of the first data word in a block during a first bus cycle, and a second condition to enable transfers of the successive words in a block during succeeding bus cycles to effect the transfer of all of the data words in the block,
   wherein the first data word in the block contains a command word including block length information identifying the number of data words in the block, said data transfer means receiving a command word from the input/output unit in response to the transmission by said transfer control means of the first condition of said encoded transfer control signal, said transfer control means receiving the command word from said data transfer means and including means for using the block length information to determine the number of data words in the block and the number of bus cycles to transmit the transfer control signal in the second condition.

25. A data transfer control unit as defined in claim 24 wherein said command word further includes command information indicating whether said data transfer control unit is to receive the remaining data words in the block from the input/output unit or to transmit the remaining data words in the block to the input/output unit, said transfer control means enabling said data transfer means to transmit data words to said input/output unit in response to the command information therefor, said transfer control means further including means for transmitting a direction control signal contemporaneously therewith.

26. A data transfer control unit as defined in claim 25 wherein said transfer control means further includes means for transmitting a termination signal when said data transfer means is prepared to transmit data words to said input/output unit.

27. A data transfer control unit as defined in claim 24 wherein said transfer control means further includes means for transmitting a termination signal in response to said data transfer means receipt of a block from said input/output unit.

28. A data transfer control unit for connection to an input/output unit over a bus to form a data transfer system for engaging in block transfers of a plurality of data words during a plurality of successive bus cycles, the bus including data transfer conductors for transferring data words and control signal conductors for transferring control signals, said data transfer control unit comprising:
   A. data transfer means for transmitting data words onto, and receiving data words from, the input/output unit over the data transfer conductors, and
   B. transfer control means connected to said data transfer means for enabling said data transfer means to transfer data signals, said transfer control means further including means for transmitting an encoded transfer control signal having a first condition to enable the transfer of the first data word in a block during a first bus cycle, and a second condition to enable transfers of the successive words in a block during succeeding bus cycles to effect the transfer of all of the data words in the block,
   wherein said data transfer control unit is connected to a plurality of input/output units, each input/output unit transmitting a request transfer control signal to initiate a block transfer with said data transfer control unit, said transfer control means further including means for receiving the request transfer control signals from said input/output units and for transmitting a select transfer control signal to one of said input/output units to enable it to engage in a block transfer.

29. A data transfer control unit for connection to an input/output unit over a bus to form a data transfer system for engaging in block transfers of a plurality of data words during a plurality of successive bus cycles, the bus including data transfer conductors for transferring data words and control signal conductors for transferring control signals, said data transfer control unit comprising:
   A. data transfer means for transmitting data words onto, and receiving data words from, the input/output unit over the data transfer conductors, and
   B. transfer control means connected to said data transfer means for enabling said data transfer means to transfer data signals, said transfer control means further including means for transmitting an encoded transfer control signal having a first condition to enable the transfer of the first data word in a block during a first bus cycle, and a second condition to enable transfer of the successive words in a block during succeeding bus cycles to effect the transfer of all of the data words in the block,
   wherein said transfer control means further includes means for detecting an error during a block transfer and means for transmitting an error transfer control signal to the input/output unit in response thereto.

30. A data transfer control unit for connection to an input/output unit over a bus to form a data transfer system for engaging in block transfers of a plurality of data words during a plurality of successive bus cycles, the bus including data transfer conductors for transferring data words and control signal conductors for transferring control signals, said data transfer control unit comprising:

A. data transfer means for transmitting data words onto, and receiving data words from, the input/output unit over the data transfer conductors, and B. transfer control means connected to said data transfer means for enabling said data transfer means to transfer data signals, said transfer control means further including means for transmitting an encoded transfer control signal having a first condition to enable the transfer of the first data word in a block during a first bus cycle, and a second condition to enable transfers of the successive words in a block during succeeding bus cycles to effect the transfer of all of the data words in the block, wherein one of the data words in a block transmitted by said data transfer control unit is a command word, said transfer control means further including means for transmitting a command transfer control signal in synchronism with the command word to indicate the transmission by said data transfer control unit of the command word, the input/output unit receiving the command word and determining whether it is to receive or transmit further data words in the block to said data transfer control unit.

31. A data transfer control unit as defined in claim 30, wherein the input/output unit transmitting a termination signal to initiate the transfer of data words to said data transfer control unit in a block transfer initiated by said data transfer control unit in response to said command transfer control signal, said transfer control means further includes means for receiving said termination signal and for receiving the data words in response thereto.

32. A data transfer control unit as defined in claim 31, wherein the input/output unit also transmits said termination signal in response to the receipt of a block of data words transmitted by said data transfer control unit, said transfer control means further including means for receiving and using said termination signal.

33. A data transfer control unit as defined in claim 32, wherein the input/output unit further transmits an error signal in response to the occurrence of an error during a block transfer initiated by said data transfer control unit in response to a command transfer control signal, said transfer control means further including means for receiving and using said error signal.

34. A data handling system comprising a data transfer control unit and an input/output unit connected by conductors for transferring information in the form of information signals and transfer control signals, A. said data transfer control unit including:
  (i) means for transmitting information signals onto and receiving information signals from information signal transfer conductors,
  (ii) means for receiving a transfer request signal from said input/output unit and for transmitting transfer control signals to said input/output unit in response thereto, B. said input/output unit comprising:
  (i) a buffer system including a plurality of buffers each comprising a plurality of addressable storage locations, one of said locations in each buffer comprising a starting location identified by a starting address, said buffers accumulating information signals for transfer with said data transfer control unit,
  (ii) buffer address control means for generating address signals which identify a storage location in said buffer system,
  (iii) buffer identification means for storing the starting addresses of said buffers in said buffer system,
  (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and
  (v) means for transmitting the contents of the location identified by said buffer address control means to said data transfer control unit.

35. A data handling system as defined in claim 34 wherein one of said transfer control signals includes a request signal transmitted by said input/output unit to said data transfer control unit when it has information to transfer thereto, said data transfer control unit including means responsive to the receipt of the request signal for enabling it to engage in a transfer of information signals with said input/output unit.

36. A data handling system as defined in claim 35 wherein said data transfer control unit is connected to a plurality of input/output units each of which transmits a request signal, said data transfer control unit further including means for transmitting a select signal to identify one of said input/output units to engage in an information transfer.

37. A data handling system as defined in claim 34 wherein each of said data transfer control unit and said input/output unit further includes:

A. means for detecting an error during a transfer, and

B. means connected to said detecting means for transmitting an error signal in response to the detection of an error by the respective error detection means; said data transfer control unit and said input/output unit further including means for receiving said error signal from the other's said error signal transmitting means.

38. A data handling system as defined in claim 34 wherein said data transfer control unit further includes means for transmitting a direction control signal indicating the direction of transfer of information signals from or to said input/output unit, said input/output unit further including means for receiving said direction control signal and enabling said buffer system to receive information signals from or transmit information signals onto said information signal transfer conductors in response to the condition of said direction control signal.

39. An input/output unit for connection to a data transfer control unit to form a data transfer system, the data transfer control unit including means for transmitting information signals onto and receiving information signals from information signal transfer conductors and means for receiving a transfer request signal from said input/output unit and for transmitting transfer control signals to said input/output unit in response thereto, said input/output unit comprising:

(i) a buffer system including a plurality of buffers each comprising a plurality of addressable storage locations, one of said locations in each buffer comprising a starting location identified by a starting address, said buffers accumulating information signals for transfer with said data transfer control unit, (ii) buffer address control means for generating address signals which identify a storage location in said buffer system, (iii) buffer identification means for storing the starting addresses of said buffers in said buffer system, (iv) enabling means connected to said buffer control means and said buffer identification means for receiving a transfer control signal from said data transfer control unit to enable said buffer address control means to load the starting address of one of said buffers from said buffer identification means, said transfer control signal further enabling said enabling means to enable said buffer address control means to increment the address generated by said buffer address control means to identify the remaining storage locations in the buffer, and (v) means for transmitting the contents of the location identified by said buffer address control means to said data transfer control unit.

40. A data transfer control unit for connection to an input/output unit over a bus to form a data transfer system for engaging in block transfers of a plurality of data words during a plurality of successive bus cycles, the bus including data transfer conductors for transferring data words and control signal conductors for transferring control signals, said data transfer control unit comprising:

A. data transfer means for transmitting data words onto, and receiving data words from, the input/output unit over the data transfer conductors, and B. transfer control means connected to said data transfer means for enabling said data transfer means to transfer data signals, said transfer control means further including means for transmitting an encoded transfer control signal having a first condition to enable the transfer of the first data word in a block during a first bus cycle, and a second condition to enable transfers of the successive words in a block during succeeding bus cycles to effect the transfer of all of the data words in the block.

* * * * *